United States Patent
Moon (10) Patent No.: US 7,925,400 B2
(45) Date of Patent: Apr. 12, 2011

(54) DEVICE FOR ADJUSTING ANGLE OF REAR AXLE

(75) Inventor: Byungsu Moon, Jeonbuk (KR)

(73) Assignee: Hyundai Motor Company, Seoul (KR)

( * ) Notice: Subject to any disclaimer, the term of this patent is extended or adjusted under 35 U.S.C. 154(b) by 788 days.

(21) Appl. No.: 11/956,181

(22) Filed: Dec. 13, 2007

(65) Prior Publication Data

US 2009/0018724 A1     Jan. 15, 2009

(30) Foreign Application Priority Data

Jul. 9, 2007     (KR) .................. 10-2007-0068470

(51) Int. Cl.
*G06F 7/00*     (2006.01)
(52) U.S. Cl. .......................................... 701/36; 701/37
(58) Field of Classification Search .................. 701/36, 701/37, 38, 39, 40; 280/124.17, 124.175, 280/124.178, 124.156
See application file for complete search history.

(56) References Cited

U.S. PATENT DOCUMENTS

| | | | |
|---|---|---|---|
| 5,860,661 A * | 1/1999 | Boucher et al. | 280/124.128 |
| 2005/0093260 A1 * | 5/2005 | Trescott | 280/86.5 |

FOREIGN PATENT DOCUMENTS

| | | |
|---|---|---|
| JP | 6-48200 | 2/1994 |
| KR | 10-0290765 | 3/2001 |
| KR | 10-0444451 B1 | 8/2004 |
| KR | 10-0610066 B1 | 8/2006 |

* cited by examiner

*Primary Examiner* — Richard M. Camby
(74) *Attorney, Agent, or Firm* — Morgan, Lewis & Bockius LLP (57) ABSTRACT

The present invention provides an active mounting apparatus for adjusting an input shaft of a rear axle to make an output shaft of a transmission and the input shaft of the rear axle in a straight line. The apparatus includes a mounting bracket, a rotatable support member, a hydraulic cylinder, a hydro supply unit, a suspension geometry measuring sensor, and a control unit. The rotatable support members are rotatably mounted on mounting bracket. The hydraulic cylinder controlled by the control unit activates a clockwise or counterclockwise position angle of rotatable support member. Therefore, even though the rear axle is moved upward or downward due to the change in load during the driving of a vehicle, an output shaft of a transmission and an input shaft of the rear axle are always aligned with each other on one straight line so as to minimize vibration, noise, and the loss of power.

3 Claims, 6 Drawing Sheets

DEVICE FOR ADJUSTING ANGLE OF REAR AXLE

CROSS-REFERENCE TO RELATED APPLICATIONS

The present application is based on, and claims priority from, Korean Application Serial Number 10-2007-0068470, filed on Jul. 9, 2007, the disclosure of which is hereby incorporated by reference herein in its entirety.

FIELD OF THE INVENTION

The present invention relates to aligning a rear axle of a rear-wheel drive vehicle, and more particularly, to an active mounting apparatus for aligning an input shaft of a rear axle by actively adjusting a position angle of a rotatable support member on the basis of movement value of the rear axle.

BACKGROUND OF THE INVENTION

Figure 1:
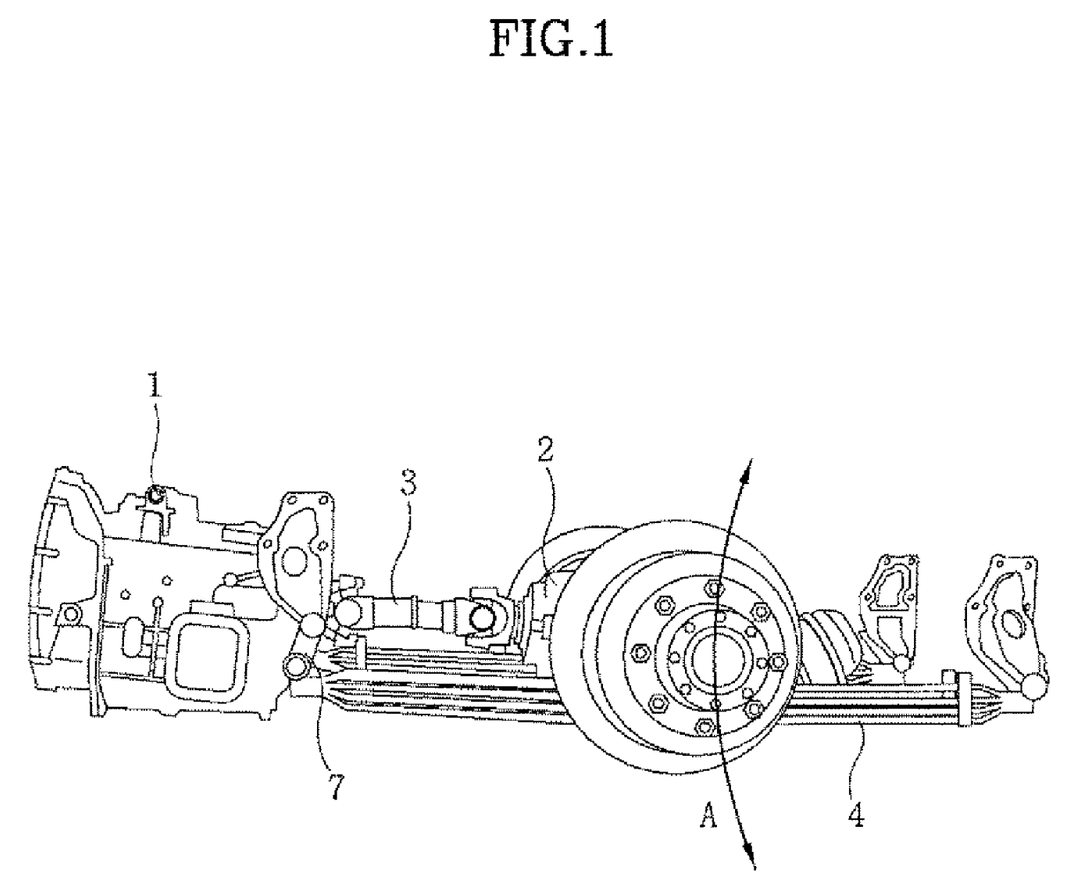
FIG. 1 is a side view showing that a transmission and a rear axle are coupled to each other in a conventional scheme.
Figure 2:
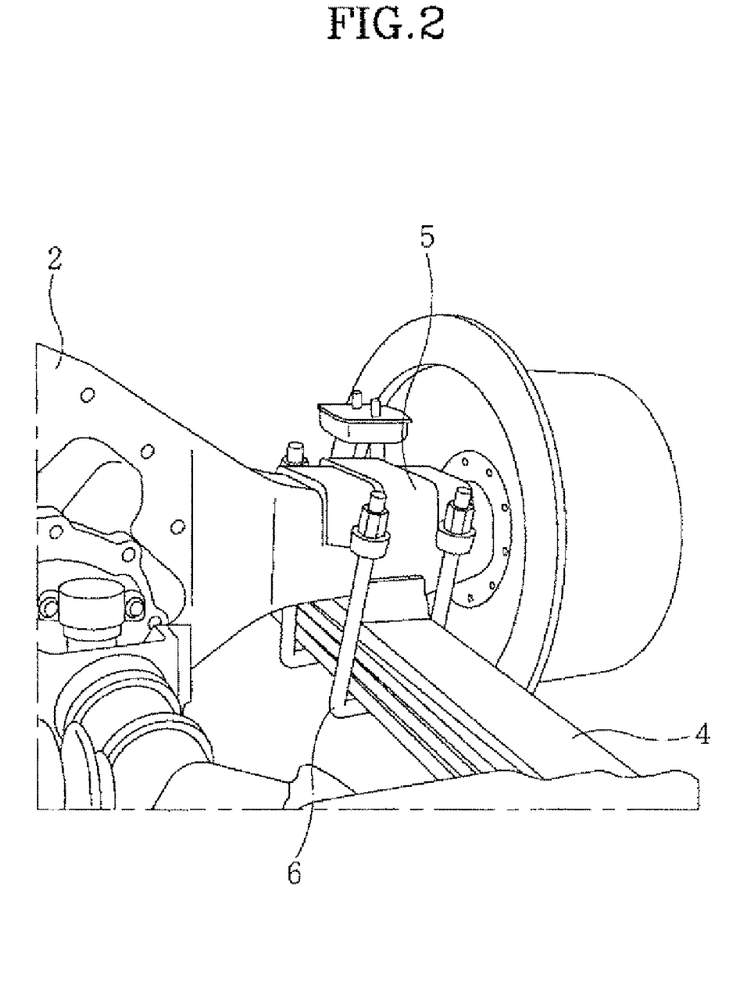
FIG. 2 is a perspective partial view of FIG. 2, showing that a rear axle in the related conventional art is mounted at an inactive mounting bracket.

As shown in FIGS. 1 and 2, in a conventional scheme, a transmission 1 and a rear axle 2 are connected to each other by a propeller shaft 3, and the rear axle 2 is mounted on the upper surfaces and at the middle portion of leaf springs 4 by an inactive mounting bracket 5 and U bolts 6.

Power output from transmission 1 is transmitted to the rear axle 2 through a propeller shaft 3, so that a vehicle is driven. The rear axle 2 is moved upward and downward in conjunction with suspension geometry, such as leaf springs 4 and a shackle 7, in a direction indicated by an arrow "A" during the driving of the vehicle.

Meanwhile an output shaft of transmission 1 and an input shaft of rear axle 2, which are coupled to each other by propeller shaft 3, should be aligned with each other on one straight line in order to satisfy constant speed conditions of universal joints, thereby minimizing vibration, noise, and the loss of power.

However, since the rear axle 2 is moved as described above due to different conditions such as road condition, weight of passengers and loaded goods, the output shaft of transmission 1 and the input shaft of rear axle 2 are misaligned with each other by an angle depending on the inertia of load during the driving of a vehicle. For this reason, there occurs a problem in that vibration, noise, and the loss of power are increased.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the aforementioned problems associated with prior arts.

Exemplary embodiments of the present invention provide an active mounting apparatus for aligning an input shalt of a rear axle by actively adjusting the position angle of a rotatable support member. As a result, even though the rear axle is moved upward or downward due to change in load during the driving of a vehicle, an output shaft of a transmission and the input shaft of the rear axle are always aligned with each other in one straight line, thereby minimizing vibration, noise, and the loss of power.

According to an exemplary embodiment of the present invention, the active mounting apparatus for aligning the input shaft of the rear axle includes a mounting bracket, a rotatable support member, a hydraulic cylinder, a hydro supply unit, a suspension geometry measuring sensor, and a control unit.

The mounting bracket is mounted on upper surfaces of leaf springs substantially at the middle portion of the leaf springs.

The rotatable support member is pivotally mounted in the mounting bracket.

The hydraulic cylinder is connected to a portion of the rotatable support member and rotates clockwise or counterclockwise the rotatable support member.

The hydro supply unit supplies and bypasses oil pressure to the hydraulic cylinder.

The suspension geometry measuring sensor detects an up-and-down movement value of the rear axle.

The control unit receives the measurement value detected by a suspension geometry measuring sensor, determines a position angle of the rotatable support member, controls the hydro supply unit to supply an oil pressure to the hydraulic cylinder to adjust the input shaft of the rear axle.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example specific dimensions, orientations, locations, and shapes will be determined in part by the particular intended application and use environment.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

A preferred embodiment of the present invention will be described in detail below with reference to the accompanying drawings.

Figure 3:
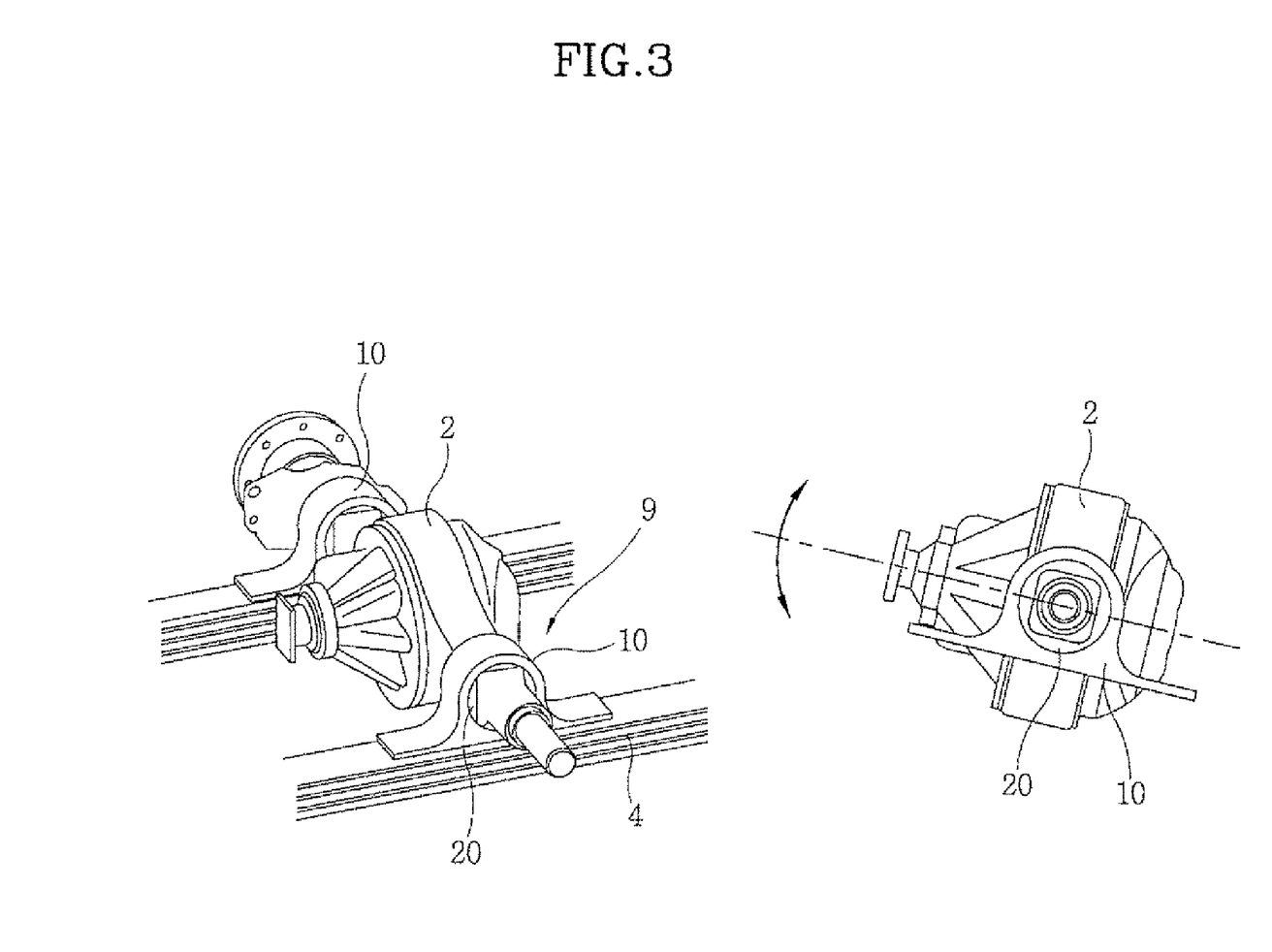
FIG. 3 is a perspective view and a side view showing that a rear axle is mounted and actively controlled according to an exemplary embodiment of the present invention.

According to an exemplary embodiment of the present invention, as shown in FIG. 3, a rear axle 2 is mounted by an active mounting apparatus 9. The rear axle 2 is positioned substantially at the middle portion of leaf springs 4 and mounted on the upper surface of leaf springs 4 by the active mounting apparatus 9.

Figure 4:
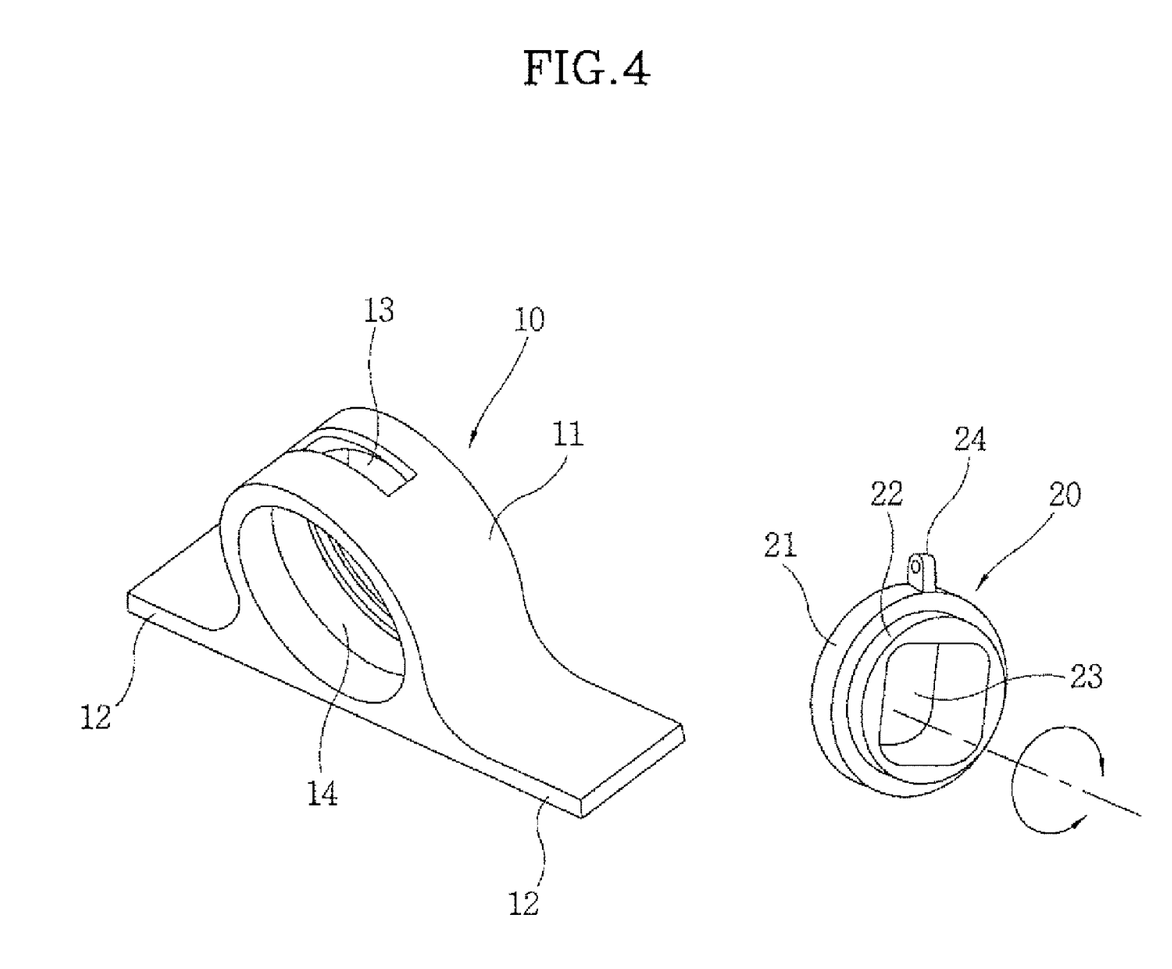
FIG. 4 is a perspective view of a mounting bracket and a rotatable support member, which are main components according to an exemplary embodiment of the present invention.

The active mounting apparatus 9 according to an exemplary embodiment of the present invention includes a mounting bracket 10 and a rotatable support member 20 as shown in FIG. 4.

The mounting bracket 10 of the active mounting apparatus 9 includes at least a flange 12 and a cylindrical retainer 11.

The flanges 12 extend outwards in a horizontal direction from a lower middle portion of a cylindrical retainer 11 of the mounting bracket 10 and are fixed substantially onto the middle upper portion of leaf spring 4 by welding or bolts.

The cylindrical retainer 11 comprises a guide groove 4 and a slot 13 according to an exemplary embodiment of the present invention.

The slot 13 having a predetermined circumferential length is formed at an upper portion of cylindrical retainer 11. A maximum position angle of the rotatable support member 20 between a proximate end and a distal end of the slot 13 may be determined by a circumferential displacement of a protrusion 24 and can be variously embodied by a person of ordinary skill in the art based on the teachings contained herein. The explanation about the protrusion 24 will be followed later in detail.

The position angle of the slot 13 is an angle that allows the maximum clockwise or -counterclockwise rotation of the rotatable support member 20, which corresponds to the maximum up-and-down movement of the rear axle 2.

The cylindrical retainer 11 further includes a guide groove 14 formed on the inner circumferential surface of the cylindrical retainer 11 so that the rotatable support member 20 is received and pivotally rotated therein.

The rotatable support member 20 installed at the cylindrical retainer 11 to support the both distal end portions of the rear axle 2, comprises a cylindrical body 21, at least a boss 22, a protrusion 24, and a supporting hole 23 as shown in FIG. 4.

At least a boss 22 protrudes outwards from one or both lateral surfaces of the cylindrical body 21 of rotatable support member 20.

A receiving hole 23 in which a distal end portion of rear axle 2 is inserted and supported therein is formed to pass substantially through the center portion of the boss 22.

In a preferred embodiment of the present invention, the shape of the supporting hole 123 is quadrangular, i.e., square or rectangular, but not limited thereto and any other shape may be employed and included as long as they carry out the function of supporting the rear axle 2.

A protrusion 24 is formed substantially on an upper portion of an outer circumferential surface of the cylindrical body 21 in a radial direction of the cylindrical body 21.

The protrusion 24 may be inserted through the slot 13 of the cylindrical retainer 11 and the cylindrical body 21 of the rotatable support member 20 may be received in the guide groove 14 of the mounting bracket 10 through the rear side of the cylindrical retainer 11 so that the protrusion 24 protrudes from the cylindrical retainer 11 through the slot 13 upwards in this embodiment.

In this case, a fixing ring (not shown) for preventing the rotatable support member 20 from being separated from the cylindrical retainer 11 may be provided at the rear side of the cylindrical retainer 11 of the mounting bracket 10.

Accordingly, the active mounting apparatus 9 can move synchronically with the movement of leaf springs 4, and the rear axle 2 can be pivotally rotated with respect to a rotational axis of the mounting brackets 10 by the rotatable support members 20 in the predetermined position angle formed along the slot 13.

Next, a structure for actively aligning an input shaft of the rear axle 2 by adjusting a position angle of the rotatable support member 20 according to an exemplary embodiment of the present invention will be followed.

Figure 5:
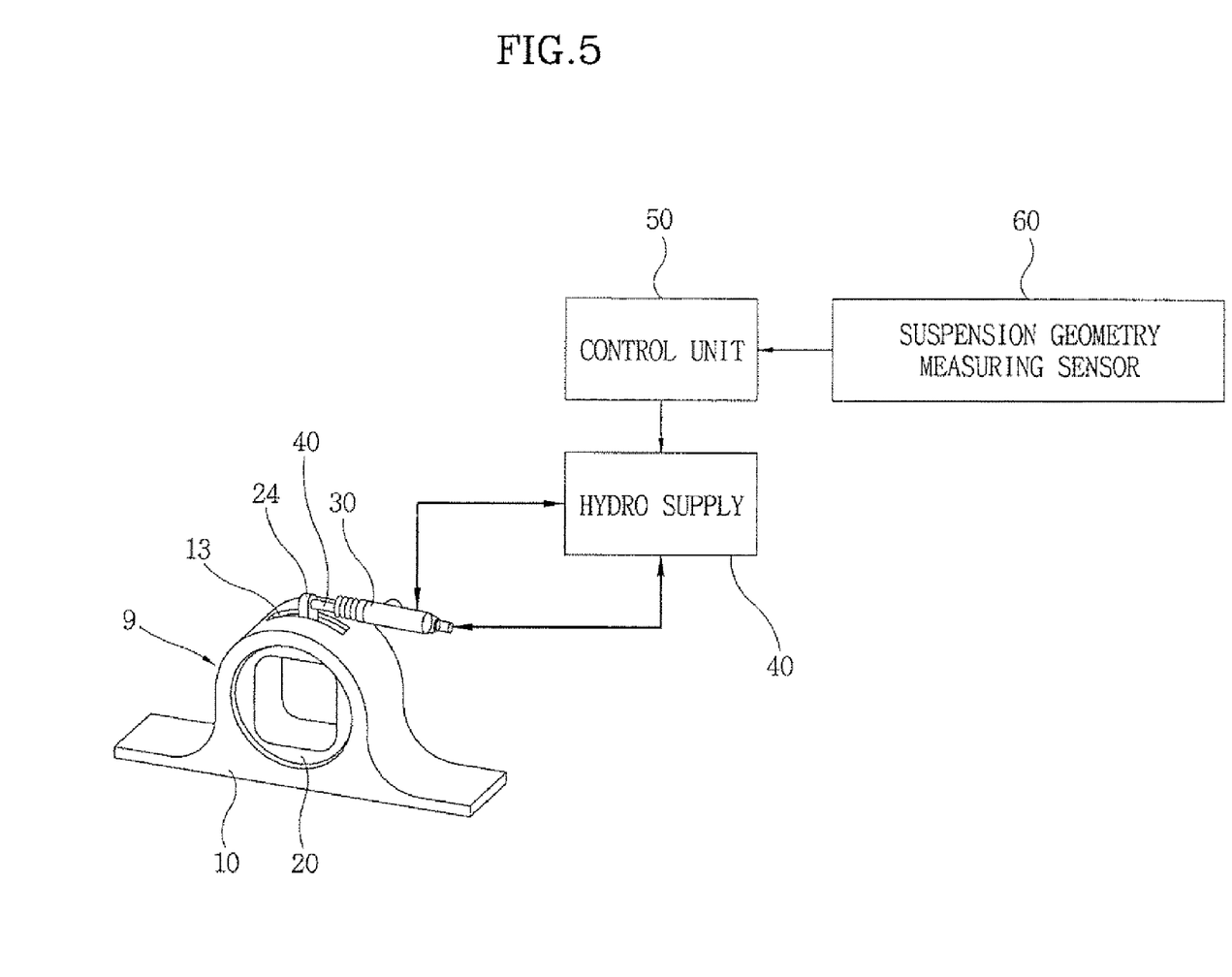
FIG. 5 is a schematic view showing the overall structure of an active mounting apparatus for actively aligning a input shaft of the rear axle by adjusting a position angle of the rotatable support member according to an exemplary embodiment of the present invention.

As shown in FIG. 5, according to an exemplary embodiment of the present invention, a cylinder rod 40 of a hydraulic cylinder 30 is connected to a distal end portion of the protrusion 24 protruding through the slot 13 of the cylindrical retainer 11

In detail, the rotatable support member 20 can be rotated clockwise or counterclockwise as the protrusion 24 moves forward or backward along the slot 13 of the cylindrical retainer 11 as the hydraulic cylinder 30 is operated. In this case, it is preferable that the hydraulic cylinder 30 be mounted by a separate bracket (not shown) fixed to the mounting bracket 10.

Further, the hydraulic cylinder 30 is a cylinder in which oil pressure can be supplied to and bypass to spaces formed on both distal sides of a piston.

A hydro supply unit 40, which is a general oil pressure supplying unit, is connected to the hydraulic cylinder 30 in order to apply the operation oil pressure to the hydraulic cylinder 30. The operation of the hydro supply unit 40 is controlled by a control unit 50, so that an oil pressure supplied to hydraulic cylinder 30 is adjusted.

In detail, the control unit 50 controls the operation of hydro supply unit 40 on the basis of an up-and-down movement value of the rear axle 2 that is caused by the change in load. For this purpose, the control unit 50 receives the measurement value detected by a suspension geometry measuring sensor 60, calculates the up-and-down moving displacement of the rear axle 2, and sends operation control signals to the hydro supply unit 40 to control the position angle of the rotatable support member 20.

As an exemplary embodiment of the present invention, a distance measuring sensor for measuring an up-and-down moving distance of the upper surface of leaf spring 4 or the upper surface of mounting bracket 10, or an angle measuring sensor for measuring a rotation angle of a shackle 7 to which one end of leaf spring 4 is fixed, may be used as the suspension geometry measuring sensor 60.

The operation of the active mounting apparatus 9 for adjusting the position angle of the rotatable support member 20 according to the exemplary embodiment of the present invention will be described below.

Figure 6:
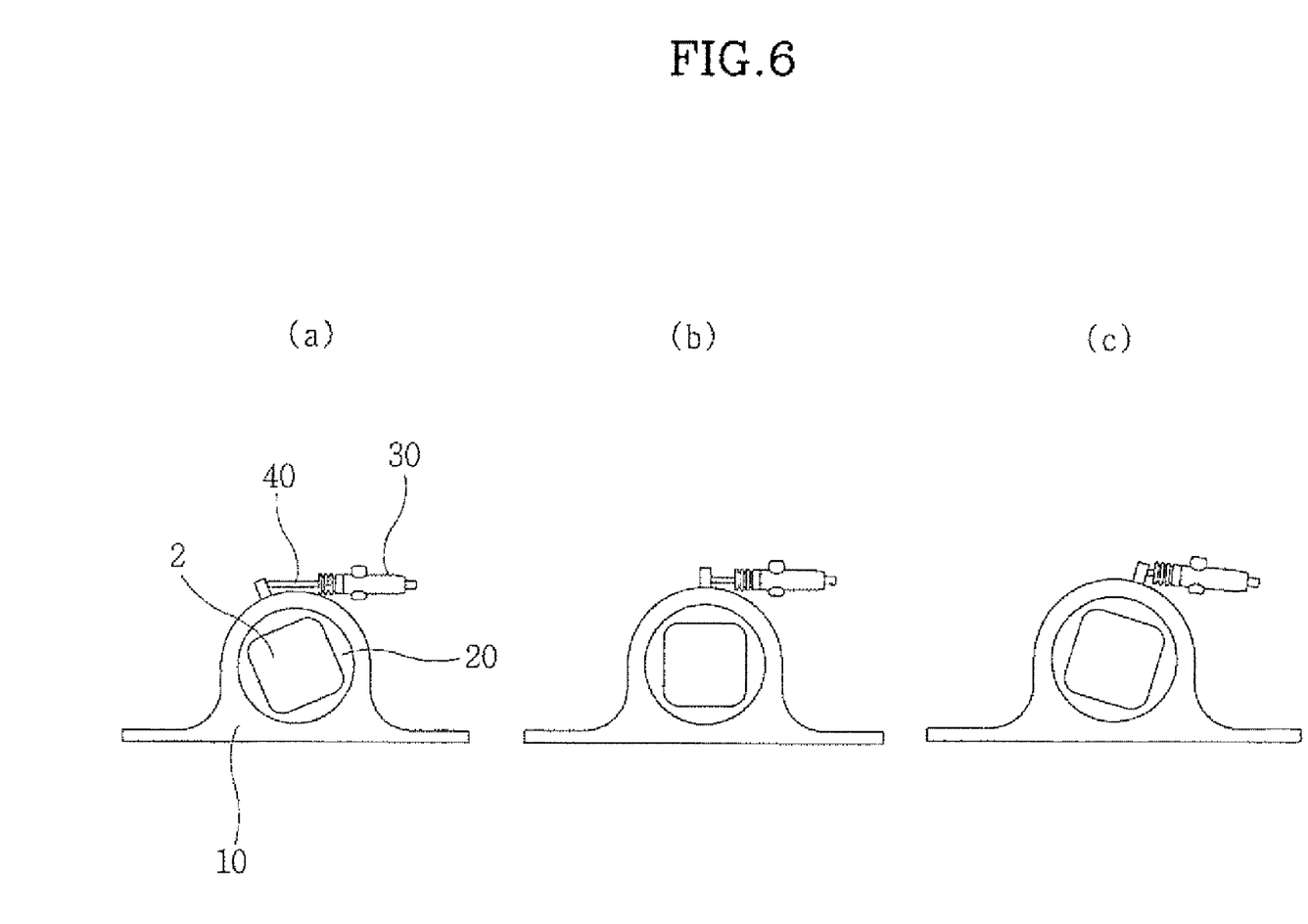
FIG. 6 is a schematic view showing the operation of an active mounting apparatus for aligning an input shaft of a rear axle by actively adjusting a position angle of the rotatable support member according to an exemplary embodiment of the present invention.

FIG. 6A shows that the rotatable support member 20 is pivotally rotated counterclockwise as the cylinder rod 40 moves forward, FIG. 6B shows that the rotatable support member 20 is not rotated, i.e., in a neutral position, and FIG. 6C shows that the rotatable support member 20 is rotated clockwise as the cylinder rod 40 moves backward.

The active mounting apparatus 9 according to the exemplary embodiment of the present invention is mounted so that the rotatable support member 20 is in the neutral state shown in FIG. 6B during the general driving of a vehicle, that is, while an output shaft of a transmission 1 and an input shaft of rear axle 2 are aligned with each other in a straight line.

However, when the rear axle 2 is moved upward due to a inertia of a load applied to the rear axle 2 during the driving of a vehicle, the control unit 50 determines a clockwise position angle of the rotatable support member 20 enough to make an output shaft of a transmission and an input shaft of the rear axle in a straight line, on the basis of a value (such as displacement or angle, etc) measured by suspension geometry measuring sensor 60 that detects the upward movement of the rear axle 2. From this calculation, the control unit 50 determines an oil pressure supplied to the rear side of the hydraulic cylinder 30 sufficient to make the clockwise position angle of the rotatable support member 20.

For this reason, since the cylinder rod 40 of the hydraulic cylinder 30 is moved forward and thus pushes the protrusion 24 forwards, the rotatable support member 20 is rotated counterclockwise with an amount of the predetermined position angle as shown in FIG. 6(a).

Since both distal ends of the rear axle 2 are inserted respectively into the supporting holes 23 positioned on both the middle portions of the leaf springs 4, and are counterclockwise rotated with an amount of the predetermined position angle in conjunction with the rotatable support members 20 integrally, the input shaft of rear axle 2 can be aligned with the output shaft of transmission 1 on one straight line even though rear axle 2 is moved upward.

In contrast, when the rear axle 2 is moved downward due to a inertia of a load applied to the rear axle 2 during the driving of a vehicle, the control unit 50 determines a counterclockwise position angle of the rotatable support member 20 enough to make an output shaft of a transmission and an input shaft of the rear axle in a straight line, on the basis of a value (such as displacement or angle, etc) measured by the suspension geometry measuring sensor 60 that detects the downward movement of the rear axle 2. From this calculation, the control unit 50 determines an oil pressure supplied to the front side of the hydraulic cylinder 30 sufficient to make the clockwise position angle of the rotatable support member 20.

For this reason, since the cylinder rod 40 of the hydraulic cylinder 30 is moved backward and thus pulls protrusion 24 backwards, the rotatable support member 20 is rotated clockwise with an amount of the predetermined position angle as shown in FIG. 6(c).

Therefore, the input shaft of rear axle 2 is rotated clockwise in conjunction with the rotatable support member 20. For this reason, even though rear axle 2 is moved downward, the input shaft of transmission 1 and the output shaft of rear axle 2 can be still aligned with each other on one straight line.

As a result, constant speed conditions of universal joints connected to both ends of a propeller shaft 3 which connects the output shaft of transmission 1 with the input shaft of rear axle 2, are desirably maintained. As a result, it is possible to minimize vibration, noise, and the loss of engine power that is transmitted to rear axle 2 from transmission 1.

Meanwhile, according to the embodiment of the present invention, the rotatable support members 20 for supporting both distal end portions of rear axle 2 are inserted into cylindrical bodies 11 of the rotatable support member 20, and are supported by the mounting bracket 19 while the outer circumferential surfaces of the rotatable support members 20 are surrounded thereon. For this reason, the rotatable support members 20 are reliably supported and the effect of rear axle 2 is minimized on the movement of the leaf springs 4. As a result, the leaf springs 4 can be more smoothly operated.

According to the present invention as described above, the angle of the input shaft of the rear axle is variably controlled on the basis of the load applied to the rear axle. Therefore, it is possible to control input/output angles of the both ends of the propeller shalt at an optimum state. As a result, it is possible to minimize noise, vibration and the loss of power.

Further, the rear axle is more reliably mounted and the leaf spring is more smoothly operated, so that suspension performance is improved.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. An active mounting apparatus for aligning an input shaft of a rear axle by actively adjusting a position angle, the apparatus comprising:
    a mounting bracket that is mounted on at least a portion of upper surface of a leaf spring;
    a rotatable support member that is pivotally mounted in the mounting bracket;
    a hydraulic cylinder that is connected to a portion of the rotatable support member and rotates the rotatable support member clockwise or counterclockwise;
    a hydro supply unit that supplies or bypasses oil pressure to the hydraulic cylinder;
    a suspension geometry measuring sensor that detects an up-and-down movement value of the rear axle; and
    a control unit that receives the up-and-down measurement value from the suspension geometry measuring sensor, determines the position angle of the rotatable support member to make an output shaft of a transmission and the input shaft of the rear axle in a straight line, based on the up-and-down measurement value from the suspension geometry measuring sensor, and controls the hydro supply unit to supply an oil pressure to the hydraulic cylinder.

2. The active mounting apparatus as defined in claim 1, wherein the mounting bracket further comprises;
    a cylindrical retainer including at least a guide groove formed on an inner circumferential surface of the cylindrical retainer that the rotatable support member is received and pivotally rotated therein, and a slot formed substantially at an upper portion of the mounting bracket along a portion of a circumference of the cylindrical retainer; and
    at least a flange formed at a lower portion of the cylindrical retainer of the mounting bracket and extending outwards substantially in a horizontal direction.

3. The active mounting apparatus as defined in claim 1, wherein the rotatable support member comprises:
 a cylindrical body,
 at least a boss formed on at least a lateral surface of the cylindrical body,
 at least a supporting hole formed at the boss which a distal end portion of the rear axle is inserted into and supported thereon, and
 a protrusion formed on a portion of an outer circumferential surface of the cylindrical body and protruding from the cylindrical body through the slot of the mounting bracket, wherein a distal end of a cylinder rod of the hydraulic cylinder is connected to the protrusion.

\* \* \* \* \*